No. 778,604. PATENTED DEC. 27, 1904.
W. A. PHILLIPS & F. HUTCHINS.
APPARATUS FOR SPINNING COTTON OR OTHER FIBERS.
APPLICATION FILED FEB. 23, 1904.
5 SHEETS—SHEET 1.
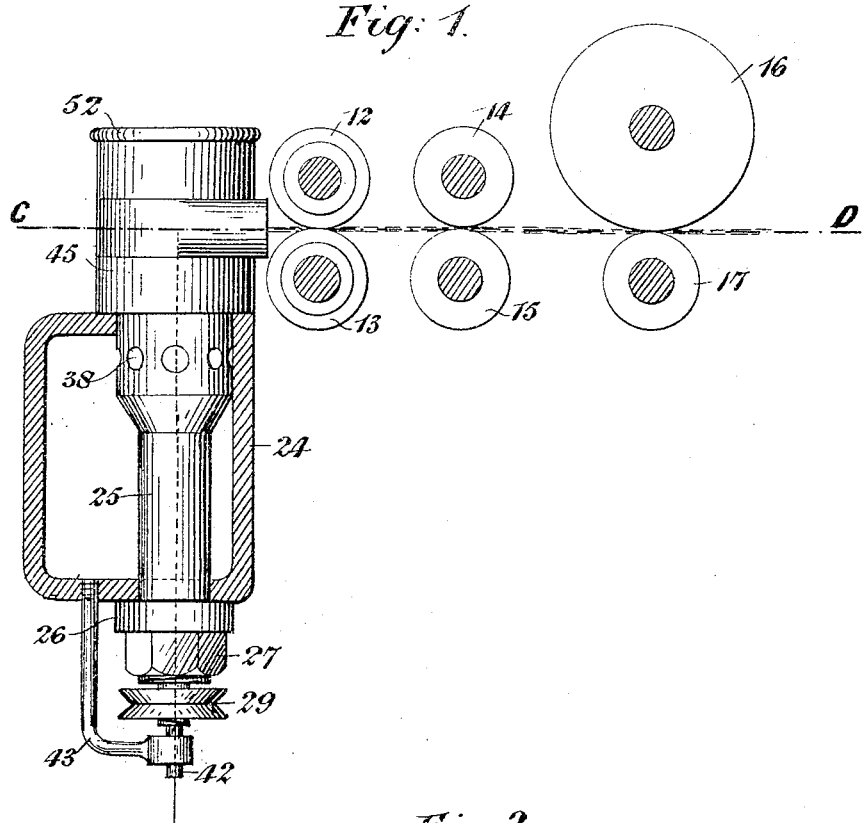
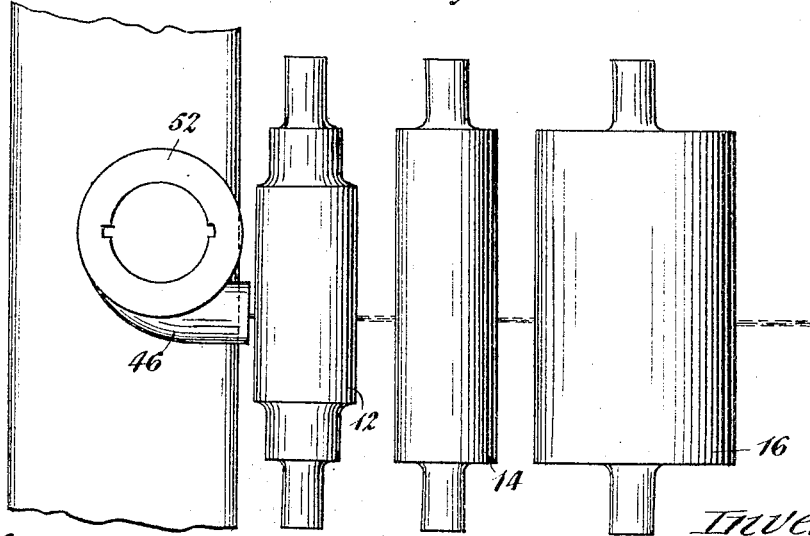

No. 778,604. PATENTED DEC. 27, 1904.
W. A. PHILLIPS & F. HUTCHINS.
APPARATUS FOR SPINNING COTTON OR OTHER FIBERS.
APPLICATION FILED FEB. 23, 1904.
5 SHEETS—SHEET 2.
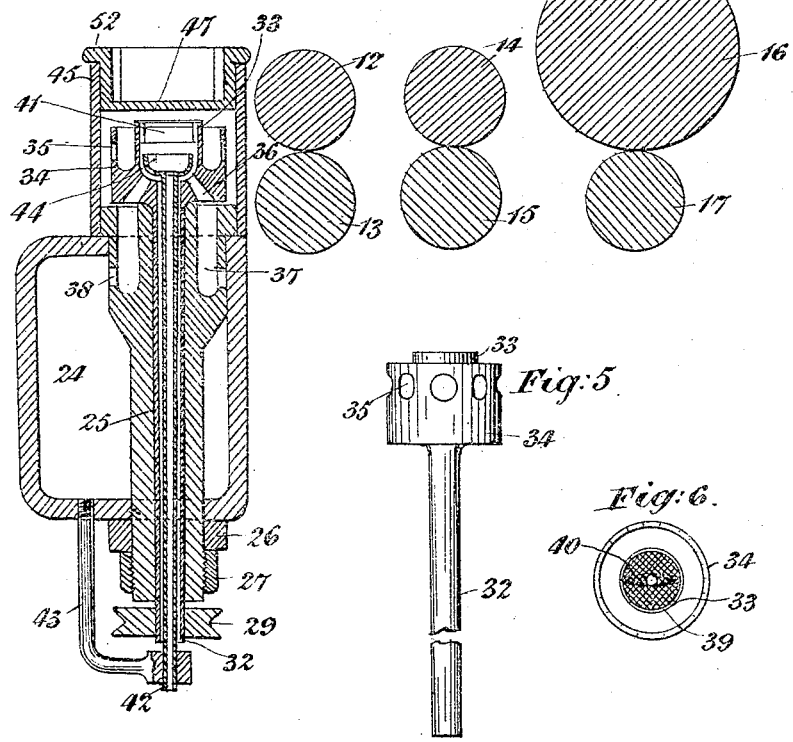
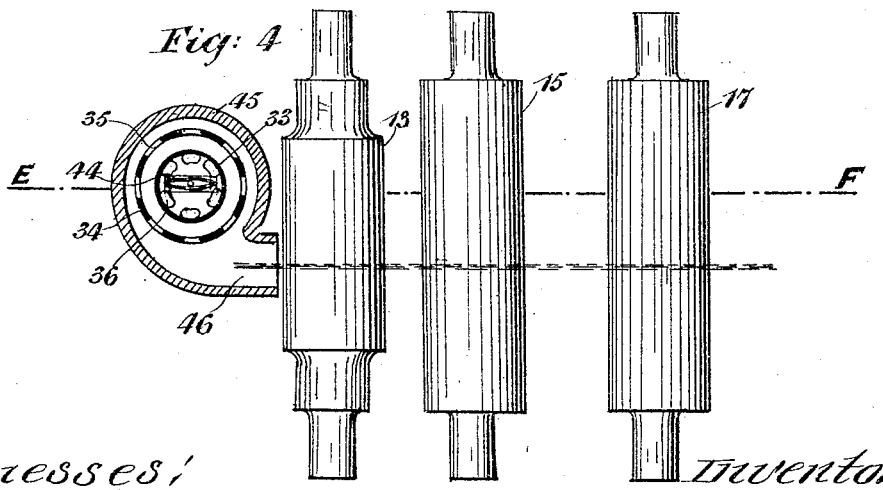

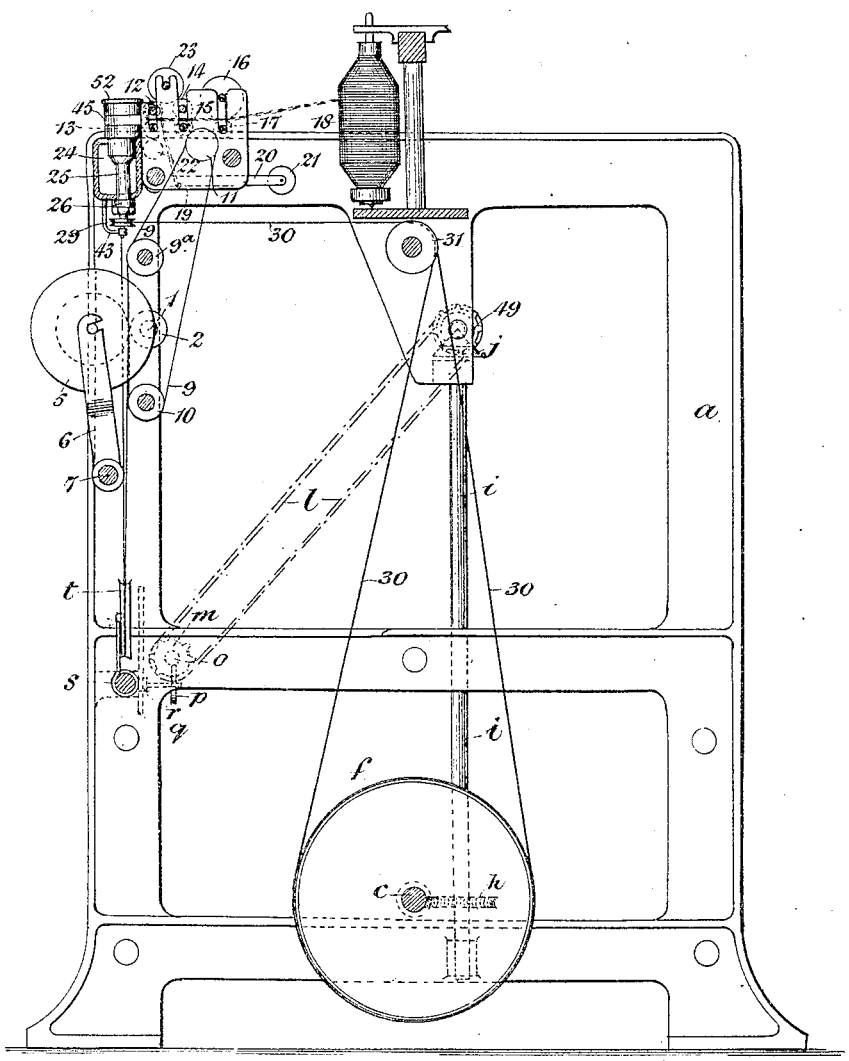

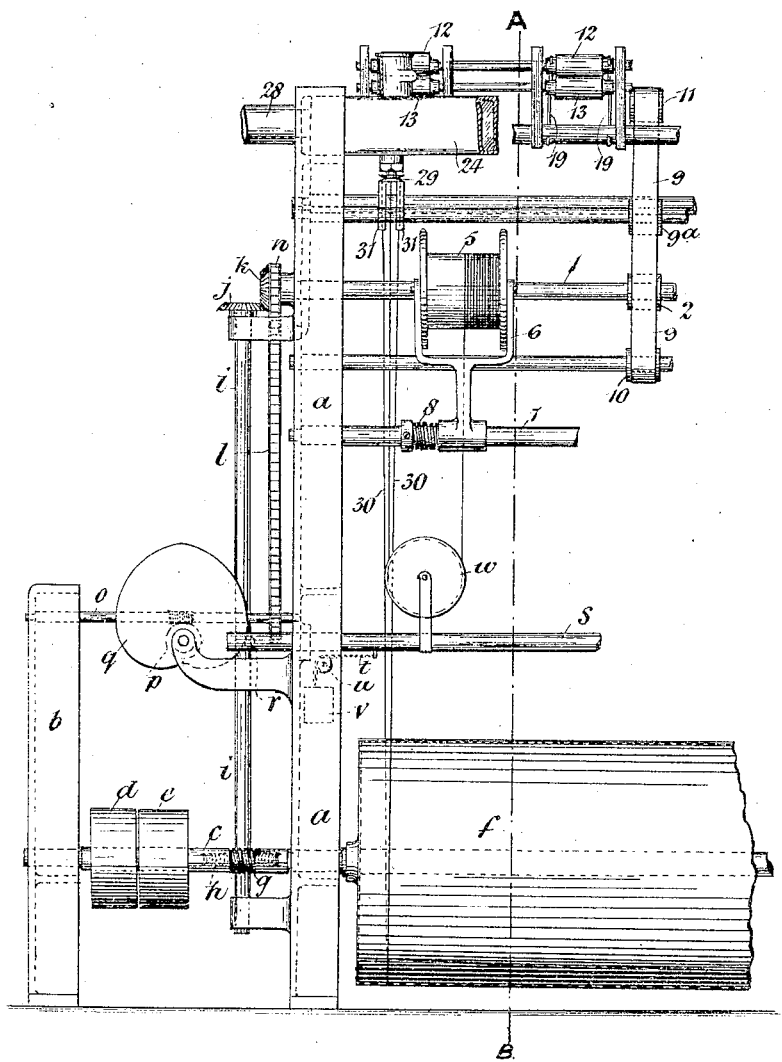

No. 778,604. PATENTED DEC. 27, 1904.
W. A. PHILLIPS & F. HUTCHINS.
APPARATUS FOR SPINNING COTTON OR OTHER FIBERS.
APPLICATION FILED FEB. 23, 1904.
5 SHEETS—SHEET 5.
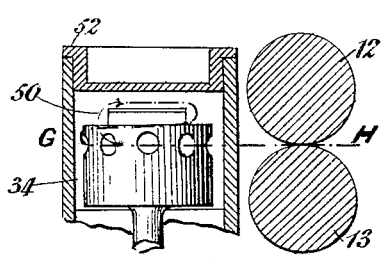
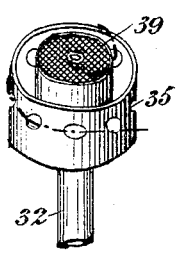
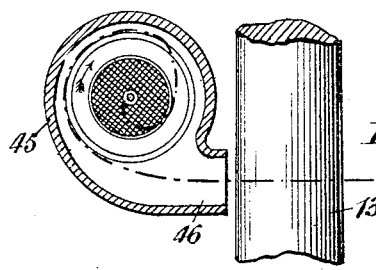
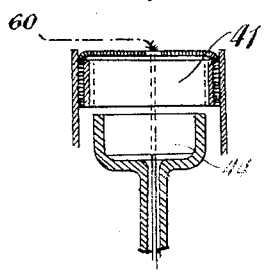
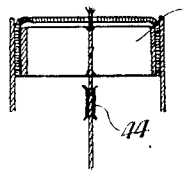

No. 778,604.                                              Patented December 27, 1904.

UNITED STATES PATENT OFFICE.

WILLIAM ALFRED PHILLIPS AND FREDERICK HUTCHINS, OF LONDON, ENGLAND; SAID PHILLIPS ASSIGNOR TO SAID HUTCHINS.

APPARATUS FOR SPINNING COTTON OR OTHER FIBERS.

SPECIFICATION forming part of Letters Patent No. 778,604, dated December 27, 1904.

Application filed February 23, 1904. Serial No. 194,864.

*To all whom it may concern:*

Be it known that we, WILLIAM ALFRED PHILLIPS and FREDERICK HUTCHINS, electrical engineers, subjects of the King of Great Britain, residing at 185 Oxford street, London, England, have invented certain new and useful Improvements in Apparatus for Spinning Cotton or other Fibers, of which the following is a specification.

The invention relates to the spinning of cotton or other fiber or of cotton and other fibers in admixture.

The fiber to be spun is supplied or fed in an essentially untwisted or unspun state to a tubular channel, where it is brought within the influence of an exhaust or induced current of air, by which the fibers are conveyed to and around the spinning-point. This spinning-point is adjacent to a central hole in a rapidly-rotating surface of wire-gauze or other reticulate material covering a revolving chamber in which a partial vacuum is created by a centrifugal air-wheel or by other suitable means of exhaust, which may be common to a number of spinning means. The first aggregation of the fibers rapidly floating around the central hole is brought into a spun line by means of a leading-thread center or core caused to be drawn through such central opening and then the fibers in succession become spun into a yarn or thread, and as this is drawn away the current of air supplies and spins fresh fibers robbed from the roving to continue the thread.

In carrying out our invention we have constructed an apparatus such as is shown in the accompanying drawings, wherein—

Figure 1 is a vertical elevation of the spindle bearing and cover. Fig. 2 is a plan thereof. Fig. 3 is a vertical section drawn through the line E F in Fig. 4, which figure is a horizontal section taken through the line C D in Fig. 1. Figs. 5 and 6 are respectively an elevation and a plan of the spindle. Fig. 7 is a vertical elevation drawn through the line A B in Fig. 8, which latter figure is a front elevation. Fig. 9 is a vertical sectional diagram through the spindle-cover, the spindle being shown in elevation. Fig. 10 is a horizontal sectional diagram through the line G H in Fig. 9 except that the spindle is shown in plan and not in section. Fig. 11 is a diagrammatic perspective view of the spindle-head, showing the gauze top. Figs. 12 and 13 are sectional diagrams of the parts adjacent to the point where the spinning occurs.

These diagrammatic figures are intended to make clearer the path taken by the stream of fibers, as shown by the dotted line. The path taken by the air is practically the same as that taken by the fibers, except that some of the air passes through the holes 35 in the outer ring of the spindle on its way to the gauze, (as indicated by the arrow 50 in Fig. 9.) Owing to the speed of relative rotation of ring and fibers, none of the fibers, however, pass through these holes in the outer ring. As a result of the air passing through these holes, the fibers of cotton or other material in use are attracted to the surface of the outer ring and the edges of the holes tend to separate any fibers which might otherwise cling together. The spindle rotates at an enormously rapid speed, and the edges of the holes have, as it were, a parallelizing loosening and beating action upon the fibers. The result of the draft of air, combined with the rotation of the spindle, is the production of a kind of vortex, which impels the fibers toward the central hole in the gauze, as indicated by the dotted line 60. In Fig. 12 the dotted line represents a single fiber the leading end of which has just reached the point where the spinning of the fibers into a yarn takes place. The air vortex causes this fiber to be spun round, so that it is made to form itself spirally into a continuation of the yarn if the previously-formed portion is drawn down at the same time, as shown in Fig. 13. A constant stream of fibers will of course give a continuous yarn, and if produced yarn is properly drawn away there will always be a little tail of fibers just above the hole in the gauze, as shown by the enlarged views, Figs. 12 and 13, and the fresh fibers are continuously building themselves up at this point, and so forming more yarn. Two sets of springs are provided, each set consisting of strips of flat steel. The function of the springs 44, which are fixtures at their opposite ends to a crutch 60, affixed to the tube 42, is to support the formed yarn against the twisting action of the rotating springs 41, which springs serve to press upon and consolidate the yarn. While it is quite possible to obtain a yarn without the pressing-spring, it would be very loose in condition, the power of the air vortex not being in itself sufficient to spin the fibers tightly enough round themselves so as to form a solid yarn.

The machine is for convenience of the drawings shown arranged for two spindles only. The machine has two standards $a$, only one of which is shown, and a supplementary standard $b$.

$c$ is the main shaft, driving the machine by means of fast and loose pulleys $d\ e$.

$f$ is a drum for driving the spindles. A worm $g$ on the main shaft $c$ drives a worm-wheel $h$, spindle $i$, bevel-wheels $j\ k$, the latter driving by chain $l$ the sprocket-wheels $m$ 49. The sprocket-wheel $m$ is fixed on a spindle $o$, having a worm driving a worm-wheel $p$. The latter is on the same spindle as the cam $q$, which operates the pin $r$ in a sliding shaft $s$, which pin $r$ is kept to its work in contact with the said cam by a chain $t$, passing over a pulley $u$ and drawn upon by a weight $v$. The shaft $s$ carries guide-pulleys $w$, one for each spindle, thereby giving traverse motion.

In Fig. 8 the left-hand spindle is shown in elevation. The right-hand portion shows the gearing between the pull-off shaft 1 and the drawing-rollers. This shaft carries a roller 2, against which a bobbin 5 is pressed by a spring 8. Between 5 and 2 is an endless band 9, passing over two loose pulleys $9^a$ and 10, thereby driving pulley 11, and a gear-wheel fastened to that pulley in turn drives suitable gearing in connection with the drawing-rollers 12, 13, 14, 15, 16, and 17. 18 is a bobbin of fibrous material, the roving from which passes through the rollers, as more clearly seen in Figs. 1 and 2. The drawing-rollers may be of the usual kind employed in existing spinning-machines. In Fig. 7 the front top rollers are shown weighted by means of two links 19 19 with two levers 20 and a weight 21. 22 23 are clearing-rollers. 24 is a box-girder extending right across the machine and carrying the spindles. The rotating spindles are carried in bearings 25, which are secured in the box-girder 24 by a washer 26 and nut 27. The interior of the box 24 is connected by a pipe 28 (see Fig. 8) with a vacuum-fan. (Not shown.) The spindle 32 is driven by a pulley 29 from the drum $f$ by means of a band 30, which band passes over two loose pulleys 31. The spindle consists of a hollow tube 32, having a head provided with two concentric rings 33 34, the latter having a series of holes 35. The bottom of the spindle-head has a ring of holes 36, so that the partial vacuum in the box 24 causes air to pass down through the holes 36 into the circular channel 37 and through the ring of holes 38. The inner ring 33 is provided with a gauze top or cover 39, having a hole in the center 40, which may conveniently be formed with an eyelet. Immediately below the gauze are two flat springs 41, rotating with the spindle 32. Inside the hollow spindle is a tube 42, held by the bracket 43, so as not to rotate, and provided at the top with two flat springs 44, similar to the springs 41. Surrounding the spindle-head is a fixed tubular casing 45, as shown in Figs. 1, 3, and 4, having an opening 46. The casing 45 is closed at the top by a closing-piece 52, dropped into the tube, which piece has, as shown, a flat bottom 47 without a hole in the center; but this bottom plate may have a hole or may be coned or domed or be provided with a blunt projection shaped somewhat as a teat or otherwise be given a form around which the vortex may be generated and the spinning into a yarn promoted.

In operation the sliver or roving of fiber, such as cotton, is conveyed to the delivery-rollers with a certain amount of draft arranged to be given to the roving in its passage between them, if so desired, and from these delivery-rollers the end of the roving is carried past the outer wall with its perforations forming the exterior of the spindle-head, whose periphery is adapted to give a certain amount of beating and separating action to aid the air-current induced by the vacuum in drawing the fibers away from the roving in a loose stream. This revolving head is inclosed in a casing to protect the fibers from extraneous influences and guide them into proximity to the edges of the openings in the outer wall 34, and the casing forms a channel which becoming constricted causes the flow of the air-borne fibers in a stream to the wire-gauze cover and around and down through the central opening in the rapidly-rotating head to receive a spiral twist and interlocking with the yarn in course of formation and removal through the fixed inner tube. The cover to this casing is, as stated, so shaped as to give the greatest aid possible to the rapid revolution of the fibers at the spinning-point.

The materials spun may be cotton, silk, (such as wild or waste silk,) rabbit's wool, or other comparatively short fibers.

Although we have particularly described the use of an induced current for the conveyance of fibers, a current of forced air or a current attained by impulsion and induction may be used.

We claim—

1. In a machine for spinning yarn from fibers drawn from a source of loosely-associated fibers, a means of continuous supply of unspun fiber, a casing to inclose the spinning device, and a spinning device including a rapidly-revolving hollow spindle, provided with a head consisting of two concentric walls, an outer wall perforated with holes for passage of air and an inner wall covered with a reticulate cover having a central hole and forming a central chamber in said head, and pressure devices for compacting the spun yarn.

2. In an apparatus for spinning cotton and other fibers of comparatively short staple by means of a current of air, a set of delivery-rollers for supplying unspun fibers in the form of a roving, means of supply of a current of air, a casing having an air-chamber and inclosing the spinning device and directing the course taken by the current of air, a hollow channeled spindle having two concentric walls, a head to said spindle composed of a centrical chamber communicating with the spindle-channel and formed by the inner one of said two concentric walls and a reticulate cover thereto the outer wall having formed in it a series of holes for passage of air, rotating springs in said chamber for compacting and twisting the fibers as soon as they are spun, air-passage leading from the spinning-chamber to said air-chamber and passages therefrom to conduct the air-current from the machine.

3. A machine for spinning fibers comprising a hollow channeled and chambered rapidly-rotating spindle, a spindle-head, means for supporting and rotating the same, a fixed hollow tube within said spindle, springs carried in a support mounted on said fixed tube and pressing the spun yarn between them, a reticulate cover to the spindle spinning-head, springs fixed in said head for holding the fibers being spun and to aid in compacting them into a solid yarn, air-passages in the spinning spindle-head to convey air, air ways therefrom to a vacuum-chamber and from said chamber for exhaust.

4. In a fiber-spinning machine, means of supply of unspun loosely-associated fibers, a casing to direct and confine a current of air for a stream of fiber floating in said current, means for the production and conveyance of an air-current, and a hollow spindle provided with a hollow double-walled head, an inner wall provided with a cover of reticulate material, having a central passage therein for yarn, an outer wall having a series of openings for passage of air and means for rotating the spindle and its head.

5. In a machine for spinning loose fibers into yarn, means for creating a current of air, a casing to direct the course of the current of air, a supply of loose fibers, a rapidly-revoluble hollow spindle and head, said head being provided with a chamber, a reticulated cover on said chamber, centrally perforated with a passage for spun fibers, and an outer wall concentric with the spindle-chamber and having a series of openings therein for the passage of air.

6. A spinner for fibers consisting of a tube, a gauze-covered head-piece connected with said tube and having a central aperture for passage of the yarn spun, rotating means for said tube, a cover partly covering said tube for directing the current of air-borne fibers and a vacuum-chamber connected to said tube.

7. A fiber-spinning device comprising a tube, the head of which is provided with a reticulated cover having a substantially central fiber-passage.

8. In an apparatus for spinning fibers, a tubular spinning-spindle, a head therefor having air and fiber passage, a vacuum-chamber connected to said tubular spindle, for maintaining a partial vacuum to and through the spindle for drawing the fibers from the rovings to the spinner and for carrying away the air, rotating means for the said spindle and its head and a cover for directing the current and forming a vortex.

In testimony whereof we have hereunto set our hands in presence of two subscribing witnesses.

WILLIAM ALFRED PHILLIPS.
FREDERICK HUTCHINS.

Witnesses:
JOHN COODE HARE,
ERNEST JOHN HILL.